United States Patent [19]
Reisinger

[11] Patent Number: 5,295,508
[45] Date of Patent: Mar. 22, 1994

[54] MIXING APPARATUS FOR PROCESSING LIQUID MULTI-COMPONENT PLASTICS, IN PARTICULAR POLYURETHANE

[75] Inventor: Gerhard Reisinger, Egling, Fed. Rep. of Germany

[73] Assignee: Elastogran Polyurethane GmbH, Lemforde, Fed. Rep. of Germany

[21] Appl. No.: 833,174

[22] Filed: Feb. 10, 1992

[30] Foreign Application Priority Data

Feb. 15, 1991 [DE] Fed. Rep. of Germany ....... 4104647

[51] Int. Cl.⁵ ............................................. F16K 11/07
[52] U.S. Cl. ..................... 137/625.4; 92/62; 137/563; 251/63.4; 425/562
[58] Field of Search ............................ 137/625.4, 563; 425/562; 251/63.4; 92/62

[56] References Cited

U.S. PATENT DOCUMENTS

| | | | |
|---|---|---|---|
| 3,706,515 | 12/1972 | Keuerleber et al. | 425/4 |
| 3,799,199 | 3/1974 | Rumpff | 137/625.4 |
| 3,964,731 | 6/1976 | Ernst | 137/563 X |
| 4,854,713 | 8/1989 | Soechtig | 137/563 X |

FOREIGN PATENT DOCUMENTS 2801942 7/1979 Fed. Rep. of Germany .

*Primary Examiner*—Robert G. Nilson
*Attorney, Agent, or Firm*—Keil & Weinkauf

[57] ABSTRACT

The mixing apparatus, which is constructed like a known mixing apparatus with return grooves (18, 19) in the control piston (2), has return grooves (18, 19) of a length which is equal to the distance between the inlet and return openings (4 to 7) to be connected by it, the control piston (2) being able to be moved into an intermediate position (B), in which the return grooves (18, 19) connect the inlet openings (4, 5) to the assigned return openings (6, 7), and into a further advanced clearing position (C), in which the return grooves are no longer connected to the return openings. Due to the short return grooves, the length of which is no longer dependent o the length of the mixing chamber or of the outlet pipe of the mixing chamber, the overall length of the mixing apparatus is shortened. It is then only twice the stroke of the control piston. The neck region of the control piston is shortened, as a result of which the area of adhesion is reduced. With a long run-out pipe, the mixing apparatus is nevertheless short.

2 Claims, 5 Drawing Sheets

MIXING APPARATUS FOR PROCESSING LIQUID MULTI-COMPONENT PLASTICS, IN PARTICULAR POLYURETHANE

The invention relates to a mixing apparatus according to the preamble of patent claim 1.

Such a mixing apparatus is disclosed by German Patent 2,007,935 and German Patent 2,801,942. A known mixing apparatus is represented in FIG. 1.

In the case of this known mixing apparatus, the return grooves are of such a length in the direction of movement of the control piston that the inlet openings are connected via the assigned return grooves to the return openings even when the control piston assumes its advanced shutting-off or clearing position. In other words, whenever the control piston is moved out of the mixing or shooting position into the shutting-off or clearing position, each inlet opening is connected to its assigned return opening. In the advanced shutting-off or clearing position, the return grooves run almost up to the outlet opening. The length of the return grooves is essentially determined by the overall stroke of the control piston. This in turn determines that the stroke of the control piston goes three times into the overall length of the mixing apparatus. If the outlet opening of the mixing chamber is far away from the inlet openings for the components, due to a long run-out, this means long return grooves and consequently a correspondingly large overall length.

It is an object of the present invention to provide a mixing apparatus of the type mentioned at the beginning which has a smaller overall length, i.e. in which the length of the return grooves is independent of the length of the mixing chamber or of the run-out.

According to the invention, the return grooves are only of such a length that they ensure the return of the components from the inlet openings to the return during the movement of the control piston on a first section. When the movement of the control piston continues up to the outlet opening from the mixing chamber, the length of which is independent of the length of the return grooves, return no longer takes place through the return grooves. During this movement of the control piston into the shutting-off or clearing position for cleaning the mixing chamber and the run-out, a corresponding return is provided in some other known way, for example by corresponding valves. In normal operation, after completion of a mixing process or a shot, the control piston is moved out of the mixing position via the intermediate position into the clearing position. After this, it is moved back into the intermediate position, in which it can then remain until the next shot is to be performed. In this intermediate position, there is provision for the conventional return through the return grooves and consequently through the mixing chamber itself. In the advanced clearing position, this takes place by an external component control which is known per se. The length of the return grooves is then dependent only on the distance between the component openings to be served. This return groove length is independent of the length of the mixing chamber or of an attached run-out pipe. During the clearing process, no recirculation takes place via the return grooves, therefore there are only undemanding requirements on the sealing behavior in the region of the run-out point. It is therefore possible to attach a separate run-out spout (claim 2) which does not have to be accurately fabricated and can be adapted to any requirements.

The overall length of the complete mixing apparatus, including the hydraulic part, is shortened. This means that, in practice, the length is then determined only by twice the stroke of the control piston.

To sum up, therefore, it may be stated that the mixing apparatus according to the invention has a smaller overall length in comparison with known mixing apparatuses, since the return groove length is no longer dependent on the length of the overall stroke of the control piston, but only on the distance between the openings to be served. Run-out spouts of different lengths can be attached to the mixing chamber. The fitting accuracy between control piston and run-out spout is no longer critical.

The invention is explained in further detail below by means of an illustrative embodiment with reference to the drawings, in which.

Figure 1:
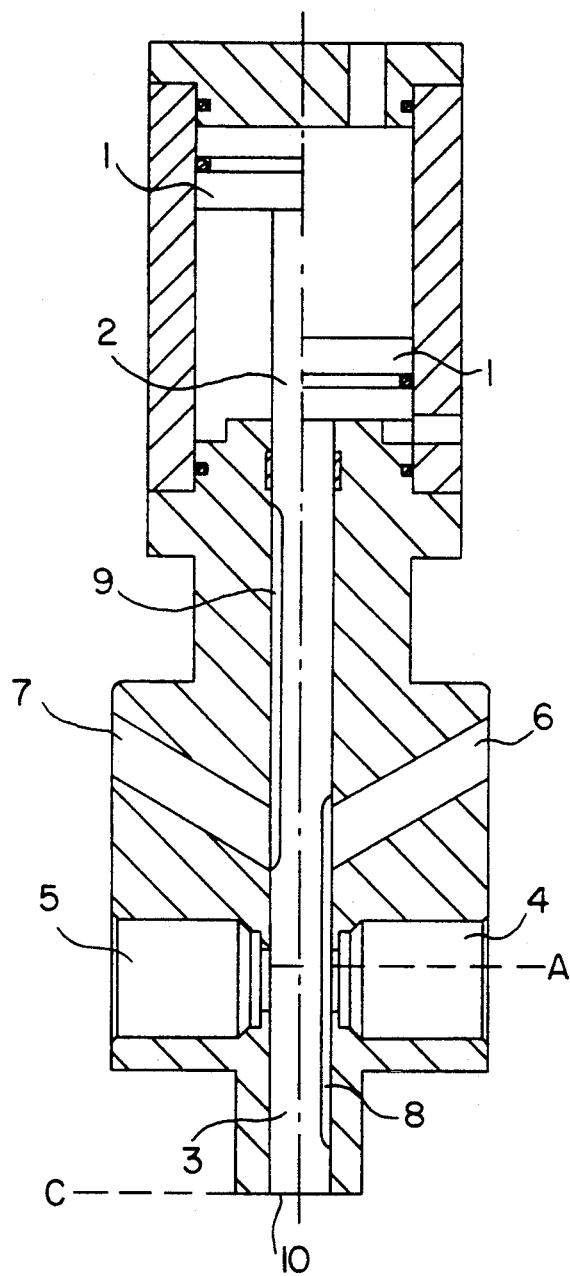
FIG. 1 shows a diagrammatic longitudinal section through a known mixing apparatus in two positions.
Figure 2:
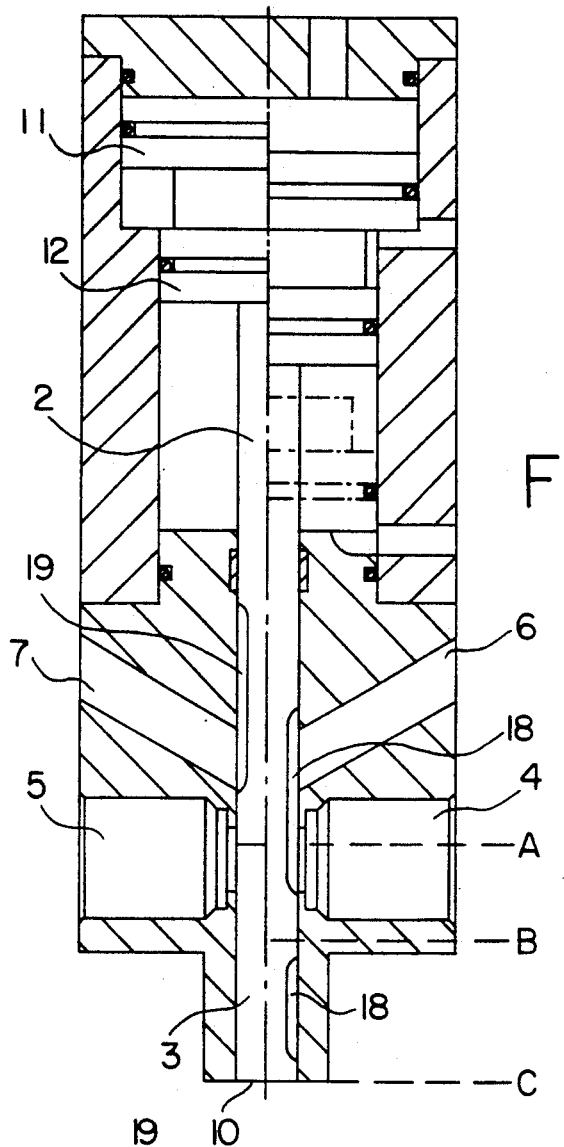
FIG. 2(A) shows a diagrammatic longitudinal section corresponding to FIG. 1 through a mixing apparatus of the invention wherein the hydraulic piston is in the upper position, the inlet openings are not closed by the control piston, and the plastic components to be mixed can enter the mixing chamber.
FIG. 2(B) shows a diagrammatic longitudinal section corresponding to FIG. 1 through a mixing apparatus of the invention wherein the hydraulic piston is moved downward to such an extent that the return grooves connect the inlet openings to the return openings. Detail "Z" shows the relationship between the return grooves, the inlet openings and the return openings.
Figure 3:
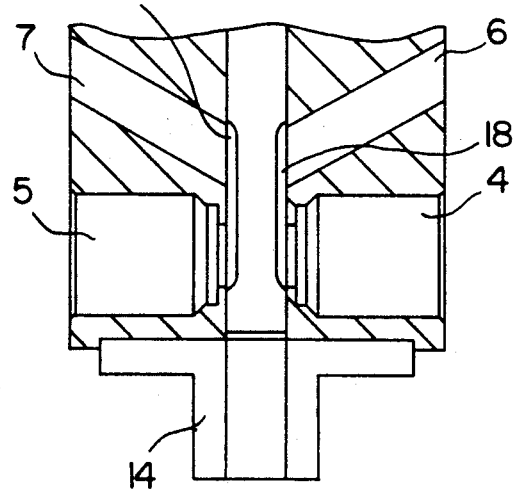
Figure 2A:
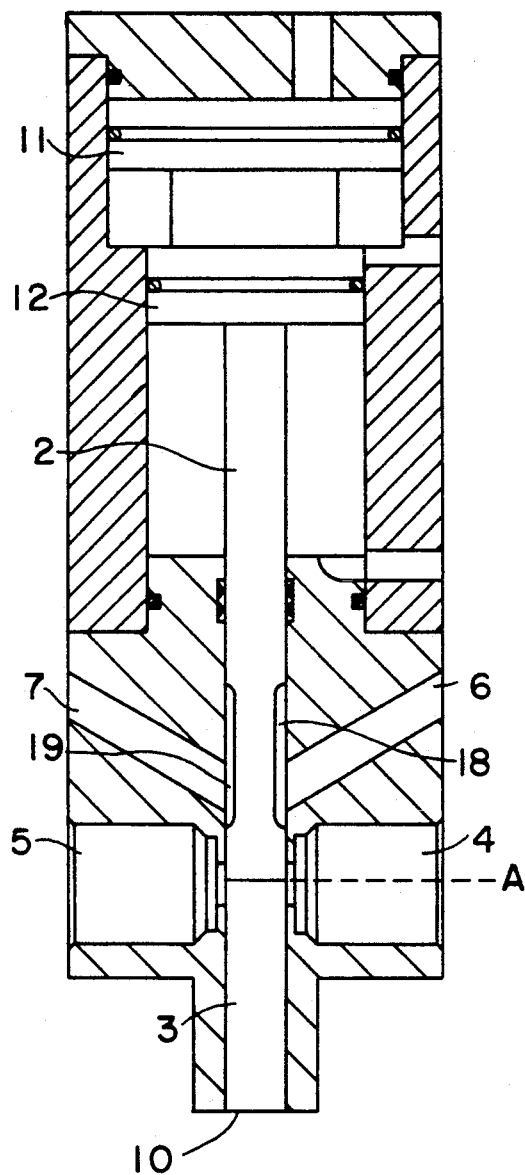
Figure 2B:
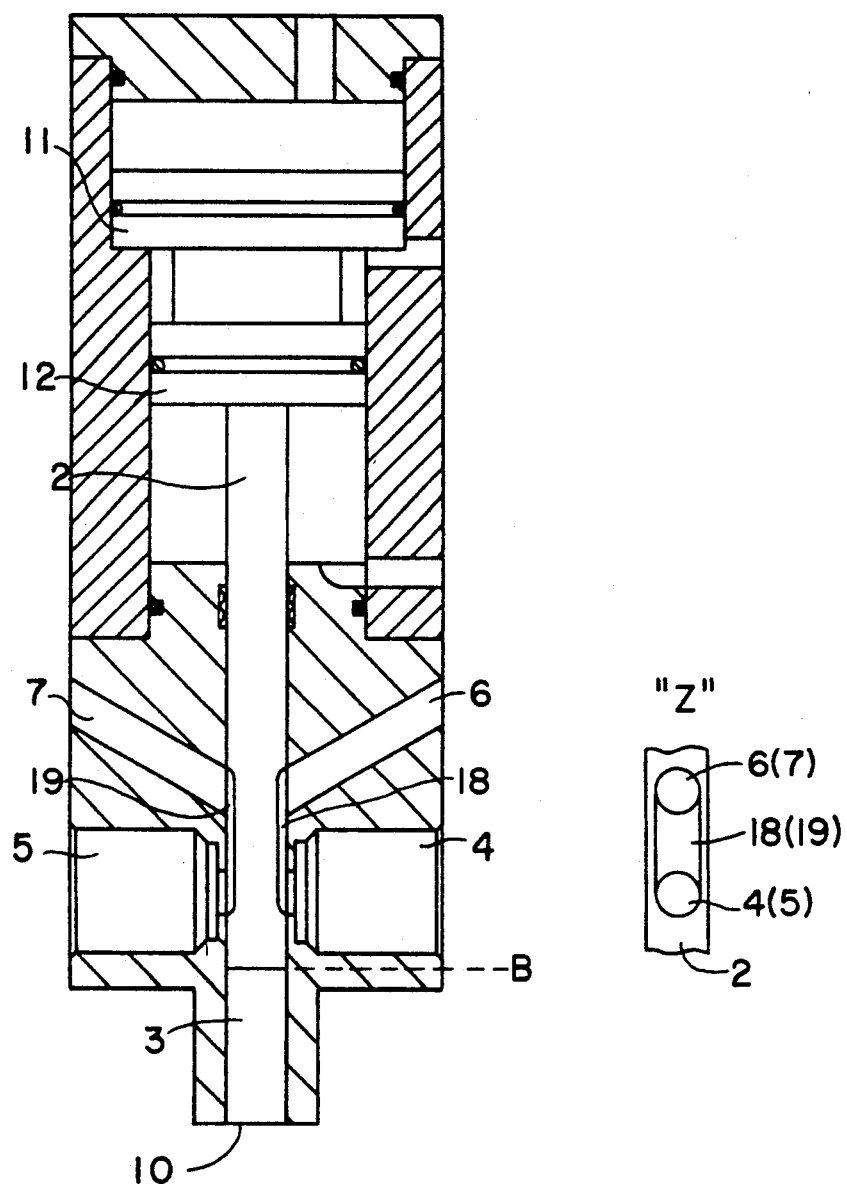
Figure 2C:
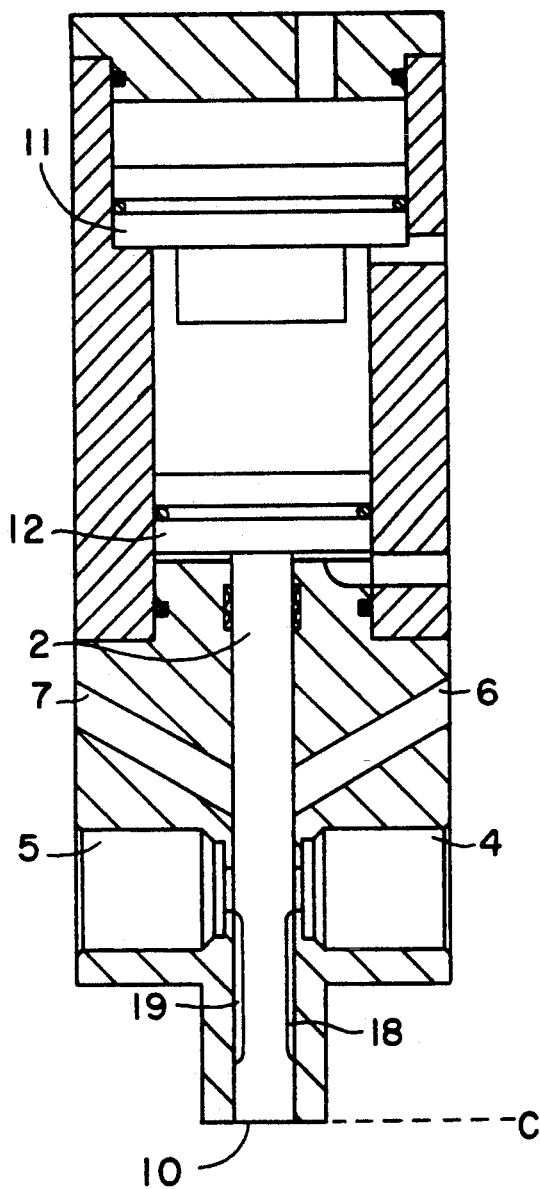

FIG. 2(C) shows a diagrammatic longitudinal section corresponding to FIG. 1 through a mixing apparatus of the invention wherein the hydraulic piston has been moved downward to such an extent that its face is flush with the outlet opening of the mixing chamber. In this position, the contents are neither mixed nor returned to the storage vessel; and FIG. 3 shows a detail of the outlet region of the mixing apparatus according to FIG. 2 in a modified embodiment.

The known mixing apparatus represented in FIG. 1 comprises a hydraulic piston 1, to which a control piston 2 is fastened. As becomes clear when considering FIG. 1, this hydraulic piston 1 can be moved with the control piston 2 from an "upper" open position into a "lower" closed position.

Into the housing there lead inlet openings 4 and 5 for two components. Mixing takes place in a mixing chamber 3. Return openings are denoted by 6 and 7. Return grooves 8 and 9 are formed in the control piston 2. The outlet opening from the mixing chamber 3 is denoted by 10.

The mixing position is shown on the left in FIG. 1. The components entering the mixing chamber 3 from the inlet openings 4 and 5 are mixed in the mixing chamber and leave again at 10. In the shutting-off or clearing position shown on the right, a meeting of the components is prevented, since they flow out of the inlet opening 4 through the return groove 8 into the return opening 6 and out of the inlet opening 5 through the return groove 9 into the return opening 7. When the control piston 2 moves from the one position into the other position, the mixing chamber is cleared, i.e. mechanically cleaned. It can easily be seen that the length of the return grooves 8 and 9 corresponds to the length of the mixing chamber, so that recirculation through the return grooves 8 and 9 is ensured during the entire stroke after shutting off entry of the components through the inlet openings 4 and 5 until in the shutting-off or clearing position. The adjoining hydraulic part is of a corresponding length. The overall length of the apparatus is determined by three times the length of the stroke of the control piston.

In FIGS. 2(A), 2(B) and 2(C), the mixing apparatus according to the invention is then shown, the same parts being provided with the same reference numerals as in FIG. 1. The hydraulic piston is of a two-part design, i.e. there are two hydraulic pistons 11 and 12. The return grooves are denoted by 18 and 19 and, as becomes clear when comparing the two FIGS. 1 and 2, very much shorter.

When the mixing position, shown in FIG. 2(A), is assumed, the components flow through the inlet openings 4 and 5 into the mixing chamber 3, in which the mixing takes place. When the mixing process is to be ended, the control piston 2 is moved out of the position. A (mixing position) into the intermediate position B as shown in FIG. 2(B) by applying pressure to the hydraulic piston 11. In this position, the return via the short return grooves 18 and 19 is performed. After that, the control piston is moved into the clearing position C as shown in FIG. 2(C) by applying pressure to the hydraulic piston 12. In this position, no recirculation through the return grooves 18 and 19 is performed. Corresponding recirculation is provided for in another way, not shown, i.e. by interposing valves (not shown). The control piston 2 remains for only a relatively short time in the clearing position C. It is then moved back into the intermediate position B in which the "conventional return" through the return grooves 18 and 19 can be performed again. In this position, it is ready for the next shot, the movement into the shooting or mixing position being only very short.

It can easily be seen that the length of the return grooves 18 and 19 is no longer dependent on the length of the mixing chamber 3, but that the length of the return grooves 18 and 19 is determined only by the distance of the inlet openings 4, 5 from the return openings 6, 7.

In FIG. 3, it is shown that a run-out spout 14 of any shape can be attached. The fitting accuracy of the bore of this run-out spout 14 in relation to the control piston 2 is not critical, i.e. no demanding requirements are made on the accuracy of fabrication.

We claim:

1. Mixing apparatus for processing liquid multi-component plastics, having a mixing chamber which has inlet openings for the individual components and an outlet opening for the component mixture, having a control piston arranged in the mixing chamber and adapted to its cross section, which control piston can be moved back and forth out of a position leaving the inlet openings open until in the region of the outlet opening, shutting off the inlet openings with respect to the mixing chamber, and having a return groove for each component, provided in the circumferential surface of the control piston, through which return groove the inlet openings can be connected to corresponding return openings simultaneously with their shutting-off from the mixing chamber, wherein the return grooves are of a length which is equal to the distance between the outermost edges of corresponding inlet and return openings to be connected by them, and wherein the control piston can be moved into an intermediate position, in which the return grooves connect the inlet openings to the corresponding return openings, and into an advanced clearing position, in which the return grooves are no longer connected to the inlet openings and corresponding return openings.

2. Mixing apparatus as claimed in claim 1, wherein a separate run-out spout can be fastened to the mixing chamber outlet.

* * * * *